US007881902B1

(12) United States Patent
Kahn et al.

(10) Patent No.: US 7,881,902 B1
(45) Date of Patent: Feb. 1, 2011

(54) HUMAN ACTIVITY MONITORING DEVICE

(75) Inventors: Philippe Kahn, Aptos, CA (US);
Arthur Kinsolving, Santa Cruz, CA (US); Mark Andrew Christensen, Santa Cruz, CA (US); Brian Y. Lee, Aptos, CA (US); David Vogel, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 0 days.

(21) Appl. No.: 12/694,135

(22) Filed: Jan. 26, 2010

Related U.S. Application Data

(63) Continuation of application No. 11/644,455, filed on Dec. 22, 2006, now Pat. No. 7,653,508.

(51) Int. Cl.
*G01C 22/00* (2006.01)
*G06F 19/00* (2006.01)
(52) U.S. Cl. .................. 702/160; 377/24.2; 702/97
(58) Field of Classification Search ............. 33/700, 33/701; 73/1.01, 1.37, 1.38, 1.75, 1.76, 1.77, 73/1.78, 1.79, 1.81; 377/1, 13, 15, 17, 20, 377/24, 24.1, 24.2; 702/1, 85, 97, 127, 141, 702/150, 155, 158, 160, 187, 189
See application file for complete search history.

(56) References Cited

U.S. PATENT DOCUMENTS

| | | | |
|---|---|---|---|
| 4,285,041 A | 8/1981 | Smith | |
| 4,578,769 A | 3/1986 | Frederick | |
| 5,446,725 A | 8/1995 | Ishiwatari | |
| 5,446,775 A | 8/1995 | Wright et al. | |
| 5,593,431 A | 1/1997 | Sheldon | |
| 5,955,667 A | 9/1999 | Fyfe | |
| 5,976,083 A | 11/1999 | Richardson et al. | |
| 6,013,007 A | 1/2000 | Root et al. | |
| 6,135,951 A | 10/2000 | Richardson et al. | |
| 6,145,389 A | 11/2000 | Ebeling et al. | |
| 6,369,794 B1 | 4/2002 | Sakurai et al. | |
| 6,493,652 B1 | 12/2002 | Ohlenbusch et al. | |
| 6,513,381 B2 | 2/2003 | Fyfe et al. | |
| 6,522,266 B1 | 2/2003 | Soehren et al. | |
| 6,532,419 B1 | 3/2003 | Begin et al. | |
| 6,539,336 B1 | 3/2003 | Vock et al. | |
| 6,611,789 B1 * | 8/2003 | Darley ..................... | 702/160 |
| 6,700,499 B2 | 3/2004 | Kubo et al. | |
| 6,790,178 B1 | 9/2004 | Mault et al. | |
| 6,813,582 B2 | 11/2004 | Levi et al. | |

(Continued)

OTHER PUBLICATIONS

"Wearable Health Reports," Technology Review, Feb. 28, 2006, http://www.techreview.com/printer_friendly_article_aspx?id+16431, Mar. 22, 2007, 3 pages.

(Continued)

*Primary Examiner*—Edward R Cosimano
(74) *Attorney, Agent, or Firm*—Blakely, Sokoloff, Taylor & Zafman, LLP; Judith A. Szepesi

(57) ABSTRACT

A method for monitoring human activity using an inertial sensor includes continuously determining an orientation of the inertial sensor, assigning a dominant axis, updating the dominant axis as the orientation of the inertial sensor changes, and counting periodic human motions by monitoring accelerations relative to the dominant axis.

11 Claims, 9 Drawing Sheets

U.S. PATENT DOCUMENTS

| | | | |
|---|---|---|---|
| 6,823,036 | B1 | 11/2004 | Chen |
| 6,826,477 | B2 | 11/2004 | Ladetto et al. |
| 6,836,744 | B1 | 12/2004 | Asphahani et al. |
| 6,881,191 | B2 | 4/2005 | Oakley et al. |
| 6,885,971 | B2 | 4/2005 | Vock et al. |
| 6,898,550 | B1 | 5/2005 | Blackadar et al. |
| 6,928,382 | B2 | 8/2005 | Hong et al. |
| 6,941,239 | B2 | 9/2005 | Unuma et al. |
| 6,959,259 | B2 | 10/2005 | Vock et al. |
| 6,975,959 | B2 | 12/2005 | Dietrich et al. |
| 7,010,332 | B1 | 3/2006 | Irvin et al. |
| 7,072,789 | B2 | 7/2006 | Vock et al. |
| 7,092,846 | B2 | 8/2006 | Vock et al. |
| 7,148,797 | B2 | 12/2006 | Albert |
| 7,158,912 | B2 | 1/2007 | Vock et al. |
| 7,169,084 | B2 | 1/2007 | Tsuji |
| 7,171,331 | B2 | 1/2007 | Vock et al. |
| 7,200,517 | B2 | 4/2007 | Darley et al. |
| 7,212,943 | B2 | 5/2007 | Aoshima et al. |
| 7,220,220 | B2 | 5/2007 | Stubbs et al. |
| 7,297,088 | B2 | 11/2007 | Tsuji |
| 7,328,611 | B2 * | 2/2008 | Klees et al. ............ 73/290 V |
| 7,334,472 | B2 | 2/2008 | Seo et al. |
| 7,353,112 | B2 | 4/2008 | Choi et al. |
| 7,387,611 | B2 | 6/2008 | Inoue et al. |
| 7,457,719 | B1 | 11/2008 | Kahn et al. |
| 7,526,402 | B2 | 4/2009 | Tenanhaus et al. |
| 7,647,196 | B2 * | 1/2010 | Kahn et al. ............ 702/149 |
| 7,653,508 | B1 * | 1/2010 | Kahn et al. ............ 702/160 |
| 7,753,861 | B1 * | 7/2010 | Kahn et al. ............ 600/595 |
| 2002/0089425 | A1 | 7/2002 | Kubo et al. |
| 2002/0109600 | A1 | 8/2002 | Mault et al. |
| 2002/0151810 | A1 | 10/2002 | Wong et al. |
| 2003/0018430 | A1 | 1/2003 | Ladetto et al. |
| 2003/0109258 | A1 | 6/2003 | Mantyjarvi et al. |
| 2003/0139692 | A1 | 7/2003 | Barrey et al. |
| 2004/0225467 | A1 | 11/2004 | Vock et al. |
| 2005/0033200 | A1 | 2/2005 | Soehren et al. |
| 2005/0222801 | A1 | 10/2005 | Wulff et al. |
| 2005/0232388 | A1 | 10/2005 | Tsuji |
| 2005/0232404 | A1 | 10/2005 | Gaskill |
| 2005/0238132 | A1 | 10/2005 | Tsuji |
| 2005/0240375 | A1 | 10/2005 | Sugai |
| 2005/0248718 | A1 | 11/2005 | Howell et al. |
| 2006/0020177 | A1 | 1/2006 | Seo et al. |
| 2006/0100546 | A1 | 5/2006 | Silk |
| 2006/0136173 | A1 | 6/2006 | Case et al. |
| 2006/0223547 | A1 | 10/2006 | Chin et al. |
| 2007/0061105 | A1 * | 3/2007 | Darley et al. ............ 702/182 |
| 2007/0063850 | A1 | 3/2007 | Devaul et al. |
| 2007/0067094 | A1 | 3/2007 | Park et al. |
| 2007/0082789 | A1 | 4/2007 | Nissila et al. |
| 2007/0125852 | A1 | 6/2007 | Rosenberg |
| 2007/0142715 | A1 | 6/2007 | Banet et al. |
| 2007/0208531 | A1 * | 9/2007 | Darley et al. ............ 702/142 |
| 2009/0043531 | A1 | 2/2009 | Kahn et al. |
| 2009/0234614 | A1 * | 9/2009 | Kahn et al. ............ 702/141 |
| 2009/0319221 | A1 * | 12/2009 | Kahn et al. ............ 702/141 |
| 2010/0056872 | A1 * | 3/2010 | Kahn et al. ............ 600/300 |
| 2010/0057398 | A1 * | 3/2010 | Darley et al. ............ 702/160 |

OTHER PUBLICATIONS

Dao, Ricardo, "Inclination Sensing with Thermal Accelerometers", MEMSIC, May 2002, 3 pages.

Lee, Seon-Woo, et al., "Recognition of Walking Behaviors for Pedestrian Navigation," ATR Media Integration & Communications Research Laboratories, Kyoto, Japan, 4 pages.

Margaria, Rodolfo, "Biomechanics and Energetics of Muscular Exercise", Chapter 3, pp. 105-125, Oxford: Clarendon Press 1976.

Mizell, David, "Using Gravity to Estimate Accelerometer Orientation", Seventh IEEE International Symposium on Wearable Computers, 2003, 2 pages.

Ormoneit, D., et al., "Learning and Tracking Cyclic Human Motion," Encyclopedia of Library and Information Science, vol. 53, supplement 16, 2001, 7 pages.

PCT International Search Report and Written Opinion for International Application No. PCT/US2008/072537, mailed Oct. 22, 2008, 10 pages.

PCT International Search Report and Written Opinion for PCT/US2009/48523, mailed Aug. 27, 2009, 8 pages.

Weinberg, Harvey, "MEMS Motion Sensors Boost Handset Reliability" Jun. 2006, http://www.mwrf.com/Articles/Print.cfm?ArticleID=12740, Feb. 21, 2007, 4 pages.

* cited by examiner ical description of the

HUMAN ACTIVITY MONITORING DEVICE

The present patent application is a continuation of U.S. application Ser. No. 11/644,455, filed on Dec. 22, 2006, now U.S. Pat. No. 7,653,508.

FIELD OF THE INVENTION

This invention relates to a method of monitoring human activity, and more particularly to counting periodic human motions such as steps.

BACKGROUND

The development of Micro-Electro-Mechanical Systems (MEMS) technology has enabled manufacturers to produce inertial sensors (e.g., accelerometers) of sufficient size, cost, and power consumption to fit into portable electronic devices. Such inertial sensors can be found in a limited number of commercial electronic devices such as cellular phones, portable music players, pedometers, game controllers, and portable computers.

Step counting devices are used to monitor an individual's daily activity by keeping track of the number of steps that he or she takes. Generally, step counting devices that utilize an inertial sensor to measure motion to detect steps require the user to first position the device in a limited set of orientations. In some devices, the required orientations are dictated to the user by the device. In other devices, the beginning orientation is not critical, so long as this orientation can be maintained.

Step counting devices are often confused by motion noise experienced by the device throughout a user's daily routine. This noise causes false steps to be measured and actual steps to be missed in conventional step counting devices. Conventional step counting devices also fail to accurately measure steps for individuals who walk at a slow pace. Such step counting devices can fail to operate for seniors and others walking at a slow pace.

BRIEF DESCRIPTION OF THE DRAWINGS

The present invention is illustrated by way of example, and not by way of limitation, and can be more fully understood with reference to the following detailed description when considered in connection with the following figures.

DETAILED DESCRIPTION

Embodiments of the present invention are designed to monitor human activity using an inertial sensor. In one embodiment, a dominant axis is assigned after determining an orientation of an inertial sensor. The orientation of the inertial sensor is continuously determined, and the dominant axis is updated as the orientation of the inertial sensor changes. In one embodiment, periodic human motions are counted by monitoring accelerations relative to the dominant axis.

Figure 1:
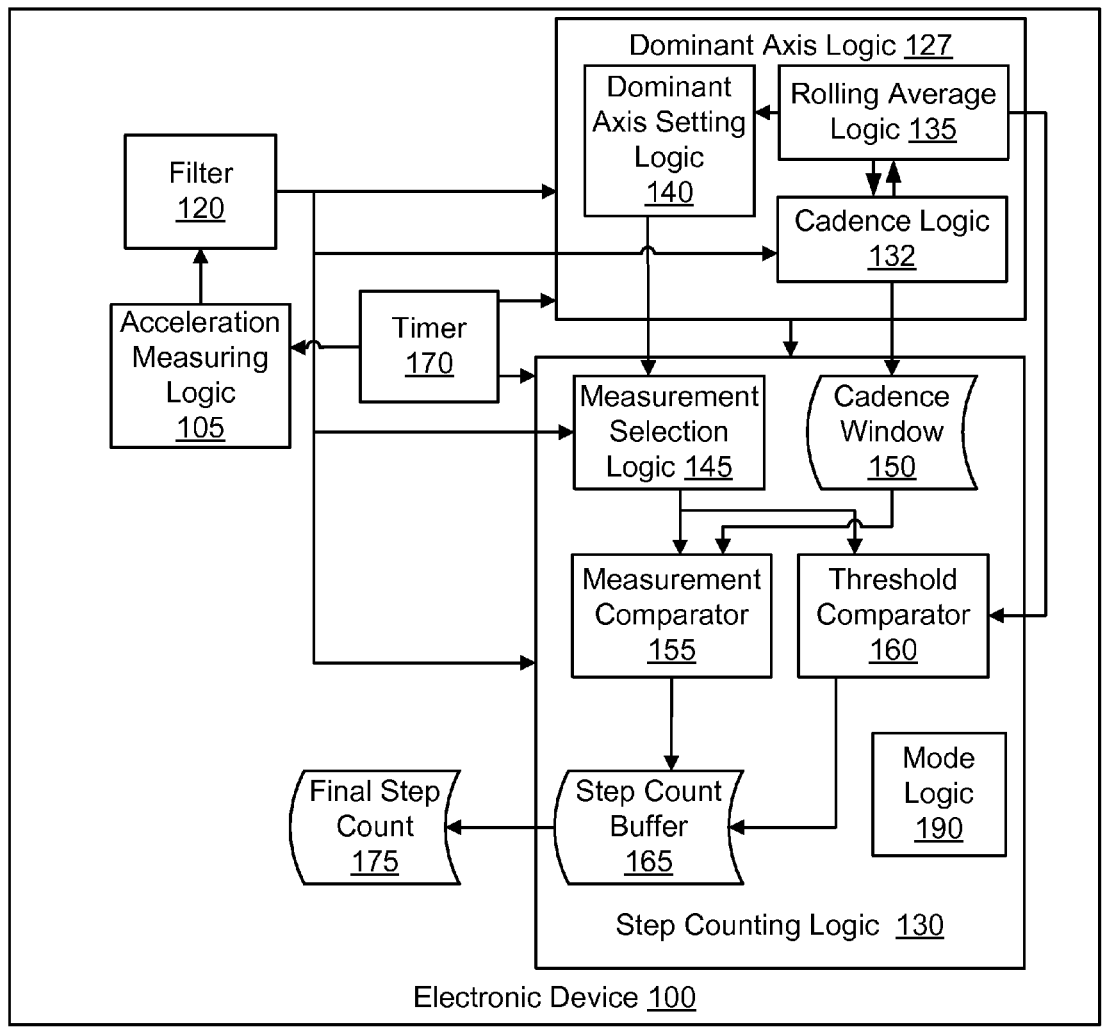
FIG. 1 is a block diagram illustrating one embodiment of an electronic device.

FIG. 1 is a block diagram illustrating an electronic device 100, in accordance with one embodiment of the present invention. The electronic device 100 in one embodiment comprises an acceleration measuring logic 105, a filter 120, a dominant axis logic 127, a step counting logic 130, a timer 170, and a final step count 175. In one embodiment, the electronic device 100 is a portable electronic device that includes one or more inertial sensors. The inertial sensors may measure accelerations along a single axis or multiple axes. The inertial sensors may measure linear as well as rotational (angular) accelerations. The electronic device 100 may be used to count steps or other periodic human motions. Steps may be accurately counted regardless of the placement and/or orientation of the device on a user. Steps may be accurately counted whether the electronic device 100 maintains a fixed orientation or changes orientation during operation. The electronic device 100 may be carried in a backpack, pocket, purse, hand, or elsewhere, and accurate steps may still be counted.

The acceleration measuring logic 105 measures acceleration data at a sampling rate. The sampling rate may be fixed or variable. In one embodiment, the acceleration measuring logic 105 receives a timing signal from the timer 170 in order to take measurements at the sampling rate. The acceleration measuring logic 105 may be an inertial sensor.

In one embodiment, measurement data is processed by the filter 120 to remove noise. The filter 120 may be implemented in hardware, software, or both hardware and software. The filter 120 may include a high pass filter, a low pass filter, a bandpass filter, a bandstop filter and/or additional filters. The filter 120 may include a digital filter and/or an analog filter. In one embodiment, a hardware digital filter includes at least one of a finite impulse response (FIR) filter and an infinite impulse response (IIR) filter. In one embodiment, an N-tap hardware digital FIR filter is used. The use of a hardware FIR filter may reduce power consumption by reducing and/or eliminating software digital filtering.

In one embodiment, the filter 120 includes multiple filters, and a determination of which filters to apply to the measurement data is made based upon an operating mode of the electronic device 100. In one embodiment, the selection of which filters to use is determined by the type of user activity detected. For example, a low pass filter may be used to remove high frequency noise that would interfere with step counting when a user is walking. In contrast, a high pass filter may be used when quick motions are to be monitored.

Filtered measurement data may be passed on to the dominant axis logic 127 and the step counting logic 130. In one embodiment, the dominant axis logic 127 includes a cadence logic 132, a rolling average logic 135, and a dominant axis setting logic 140. In an alternative embodiment, more or fewer logics may be used to determine a dominant axis. Alternative means of identifying a dominant axis may be used in other embodiments.

In one embodiment, the dominant axis logic 127 is used to determine an orientation of the electronic device 100 and/or an inertial sensor within the electronic device 100. In alternative embodiments, other logics may be used to determine an orientation of the electronic device 100.

Referring to FIG. 1, the cadence logic 132 may determine one or more sample periods to be used by the rolling average logic 135, and may determine a cadence window 150 to be used by the step counting logic 130. In one embodiment, the cadence logic 135 detects a period and/or cadence of a motion cycle. The period and/or cadence of the motion cycle may be based upon user activity (e.g. rollerblading, biking, running, walking, etc).

Many types of motions that are useful to keep track of have a periodic set of movements. Specific periodic human motions may be characteristic of different types of user activity. For example, to walk, an individual must lift a first leg, move it forward, plant it, then repeat the same series of motions with a second leg. In contrast, a person rollerblading performs a repeated sequence of pushing, coasting and liftoff for each leg. For a particular individual, the series of walking motions will usually occur in about the same amount of time, and the series of rollerblading motions will usually occur in the same amount of time. The repeated set of motions can be considered a unit, and defines the motion cycle. The amount of time that it takes to complete one motion cycle defines the motion cycle's period, and the number of motion cycles that occur in a given unit of time define the motion cycle's cadence. For simplicity, the term "step" is used in this application to describe the user activity being evaluated. However, in the context of this application, the term "step" should be taken to mean any user activity having a periodic set of repeated movements.

Figure 2:
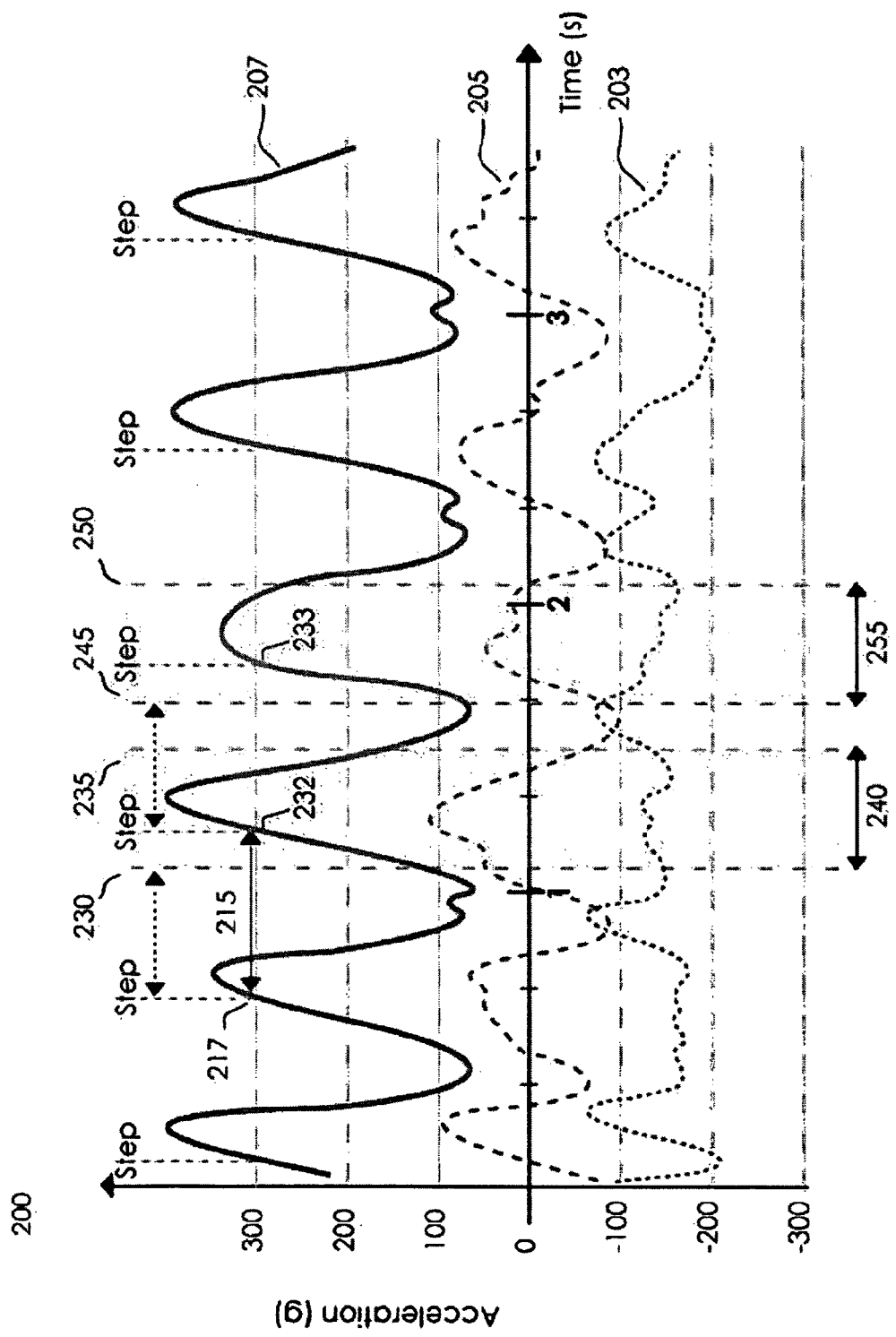
FIG. 2 illustrates an exemplary cadence of motion graph that measures time versus acceleration, in accordance with one embodiment of the present invention.

FIG. 2 illustrates an exemplary motion cycle graph 200 that measures time versus acceleration, in accordance with one embodiment of the present invention. The exemplary motion-cycle graph 200 shows acceleration data taken with a single tri-axis inertial sensor. The acceleration at a given period of time is represented for a first axis 203 of the inertial sensor, a second axis 205 of the inertial sensor, and a third axis 207 of the inertial sensor. In one embodiment, the cadence logic 132 of FIG. 1 analyzes the acceleration along the first axis 203, second axis 205 and third axis 207 to detect a motion cycle. Once a motion cycle is detected, a period of the motion cycle is determined, and a cadence of the motion cycle is determined. FIG. 2 shows an exemplary period of a motion cycle 215 for the third axis 207, the period being approximately 0.6 seconds. The same period can also be seen to a lesser degree in the second axis 205 and the first axis 203. The corresponding cadence to the motion cycle is approximately one hundred motion cycles per minute.

In one embodiment, once a stepping period (or other motion cycle period) is determined, that period may be used to set the cadence window (the allowable time window for steps to occur). In one embodiment, the period is updated after each step. The current stepping period may be a rolling average of the stepping periods over previous steps, as discussed in more detail with reference to the rolling average logic 135 of FIG. 1.

A cadence window may be used to facilitate accurate measurement of a step, or other periodic human motion. A cadence window is a window of time since a last step was counted that is looked at to detect a new step. A cadence window may be set based on the period and/or cadence of the actual motion cycle (e.g., a stepping period), on set limits, and/or on other determiners.

Referring to FIG. 2, an exemplary first cadence window 240 and second cadence window 255 are shown. The first cadence window 240 may be defined by a first cadence window minimum 230 and a first cadence window maximum 235. The second cadence window 255 may be defined by a second cadence window minimum 245 and a second cadence window maximum 250. In one embodiment, the cadence window minimums 230 and 245 and cadence window maximums 235 and 250 are determined by measuring lengths of time since the most recent step was counted. In one embodiment, this length of time is measured via the timer 170 of FIG. 1. In other embodiments, other variables may be used to set the cadence window. For example, cadence windows may be determined by measuring cumulative amounts of acceleration that have been measured since the previous step was counted.

Returning to FIG. 2, cadence windows may be used to count steps until an expected step is not encountered. In one embodiment, new cadence windows are determined periodically. In one embodiment, the cadence window is a dynamic cadence window that continuously updates as a user's cadence changes. For example, using a dynamic cadence window, a new cadence window length may be set after each step. The cadence window minimums may be determined by subtracting a value from the stepping period, and the cadence window maximums may be determined by adding a value to the stepping period. In one embodiment, the cadence window maximums are preset, and the cadence window minimums are updated after each step is counted. In one embodiment, the cadence window minimums are preset, and the cadence window maximums are updated after each step is counted. In one embodiment, both the cadence window minimums and cadence window maximums are updated when a step is counted. In one embodiment, the current cadence window minimum is determined by subtracting 200 ms from the current stepping cadence period. In one embodiment, the cadence window minimum has a minimum value of 240 ms.

In the illustrated embodiment of FIG. 2, a first step 217 is counted at 0.65 seconds, and a second step 232 is counted at approximately 1.15 seconds. The first cadence window 240 opens at approximately 0.4 seconds from the first step 217, and closes at approximately 0.8 seconds from the first step 217. As shown, the second step 232 falls within the first dynamic cadence window 240. A third step 233 falls within the second dynamic cadence window 255, which may have a second cadence window minimum 245 and second cadence window maximum 250 that are different from the first cadence window minimum 230 and first cadence window maximum 235. The illustrated second cadence window minimum is about 0.35 seconds from the second step 232, and the second cadence window maximum 250 is about 0.75 seconds from the second step 232. Other cadence window minimums and maximums are also possible. When motion criteria (e.g., threshold conditions) are met within a cadence window, a step is detected, whereas when motion criteria are met outside of the cadence windows no step is detected.

If no previous steps have been detected, there is no cadence minimum, and a step may be detected at any time that motion criteria are met. If fewer than the required number of steps to determine a dynamic cadence window have been detected, then the cadence window may have a default minimum and maximum value. In one embodiment, the cadence window has a default minimum of around 325 ms and a default maximum of around 1000 ms. Once enough steps have been detected to determine a dynamic stepping cadence or period, the cadence window may be set to the determined stepping period plus or minus an error factor. In one embodiment, a count of between about two to about ten periodic human motions is sufficient to set a dynamic cadence window.

The cadence of any periodic human motion will generally not change more than a certain amount in a given time period. In one embodiment, the cadence window may be sufficiently wide to continue counting periodic human motions even when a stepping cadence changes. In one embodiment, the cadence window is narrower, and steps may not be counted when a stepping cadence changes. So as not to miss steps, once a new stepping cadence is detected, previous measurements may be examined to determine whether they register as steps under the new stepping cadence and a new cadence window. Therefore, steps may be counted even if they did not occur in the original cadence window. The cadence window may update dynamically to a user's actual cadence. Human cadences change within a known window of rates, and so steps can be differentiated from other noise. This may ameliorate and/or eliminate missed step counts due to changes in cadence.

In one embodiment, when steps repeatedly occur at a time different from the current stepping period, a new stepping period and a new cadence window are set. For example, when the stepping period is 0.7 seconds, and a step occurs about every 0.6 seconds enough times in a row, then the stepping period is changed to 0.6 seconds and a new cadence window is set based on the changed stepping period.

Returning to FIG. 1, once the stepping period is detected, the cadence logic 132 may set one or more sample periods for the rolling average logic 135 to use based upon the stepping period. In one embodiment, the sample period(s) are set such that at least one sample period is approximately the length of, or longer than, the stepping period. In one embodiment, a sample period is set such that it is a multiple of the stepping period.

The rolling average logic 135 creates one or more rolling averages of accelerations as measured by the inertial sensor(s) over the sample period(s) set by the cadence logic 132. The rolling averages of accelerations may be used for determining an orientation of the electronic device, for determining thresholds to compare acceleration measurements against, and/or for other purposes. In one embodiment, the rolling average logic 135 creates a rolling average of accelerations for determining an orientation of the electronic device 100, the rolling average having a period that is at least the stepping period. In one embodiment, the rolling average logic creates a rolling average of accelerations for determining a lower threshold to compare acceleration measurements against, the rolling average having a sample period that is at least twice the stepping period.

The rolling average logic 135 may create one or more rolling averages of data other than accelerations. In one embodiment, the rolling average logic 135 creates a rolling average of stepping periods, where the rolling average is the rolling average time between steps. In one embodiment, the rolling average of stepping periods is calculated over the past four counted steps. The rolling average of the stepping periods may be used by the cadence logic 132 to determine a cadence window and a current stepping cadence.

In one embodiment, rolling averages may be maintained in registries that keep track of rolling average values and the number of samples that were used to calculate current rolling average values. When a new measurement is taken, it can be incorporated into the previous rolling average value, and the registry can than be updated with a new rolling average value. Alternatively, the rolling averages may be maintained by buffering the measurements used to calculate the rolling averages. As the buffers fill, oldest measurement data can be discarded and replaced by new measurement data. The measurements in the buffer can be averaged after each measurement to determine a new rolling average.

In one embodiment, the dominant axis setting logic 140 determines an orientation of the electronic device 100 and/or the inertial sensor(s) within the electronic device 100. The orientation may be determined based upon the rolling averages of accelerations created by the rolling average logic 135. In one embodiment, once the orientation is determined, a dominant axis is assigned based upon the orientation. Determining an orientation of the electronic device 100 may include identifying a gravitational influence. The axis with the largest absolute rolling average may be the axis most influenced by gravity, which may change over time (e.g. as the electronic device is rotated). Therefore, a new dominant axis may be assigned when the orientation of the electronic device 100 and/or the inertial sensor(s) attached to or embedded in the electronic device 100 changes.

In one embodiment, the actual axis with the largest absolute rolling average over the sample period is assigned as the dominant axis. In alternative embodiments, the dominant axis does not correspond to one of the actual axes of the inertial sensor(s) in a current orientation, but rather to an axis that is defined as approximately aligned to gravity. In one embodiment, the dominant axis corresponds to a virtual axis that is a component of a virtual coordinate system. In one embodiment, the dominant axis setting logic 140 assigns the dominant axis by performing a true gravity assessment, such as by doing trigonometric calculations on the actual axes based on the gravitational influence. In one embodiment, the dominant axis setting logic 140 assigns the dominant axis by comparing the gravitational influence to a data structure such as a lookup table, associative array, hash table, adjacency matrix, etc.

Returning to FIG. 1, the step counting logic 130 may include a measurement selection logic 145, a cadence window 150, a measurement comparator 155, a threshold comparator 160, a step count buffer 165, and a mode logic 190. The measurement selection logic 145 may determine which measurements from the measurement buffer to use to determine if a step has occurred. In one embodiment, the measurement selection logic 145 may monitor accelerations relative to the dominant axis, and select only those measurements with specific relations to the dominant axis for measurement. For example, only accelerations that are approximately parallel to the dominant axis may be selected, or alternatively, only accelerations that are approximately perpendicular to the dominant axis may be selected. In one embodiment, the measurement selection logic 145 selects only measurements of acceleration data along the dominant axis. In alternative embodiments, measurements of acceleration data along other axes may also be used. In one embodiment, measurements of acceleration along only the other axes are used.

Selected measurements may be forwarded to the measurement comparator 155 and the threshold comparator 160 to determine whether a step has occurred. The measurement comparator 155 may compare a current measurement to previous measurements. Based on this comparison, a current measurement may qualify as a step if it has met certain comparison criteria, as discussed in more detail with reference to FIG. 8.

In one embodiment, a motion cycle graph is maintained, and the current measurement is compared to the motion cycle graph. If the motion cycle graph indicates that the current measurement in relation to preceding measurements fits the profile of a step, then a step may be counted. Otherwise a step may not be counted.

Returning to FIG. 1, the threshold comparator 160 disqualifies measurements from being counted as steps for failure to meet certain thresholds. In one embodiment, measurements must be larger than a lower threshold to qualify as a step. In one embodiment, the threshold comparator 160 compares measurements to an upper threshold. In one embodiment, only a measurement having a smaller absolute value of acceleration than the upper threshold and a higher absolute value than the lower threshold is counted as a step. The upper threshold and the lower threshold are discussed in more detail below with reference to FIG. 8.

In one embodiment, the threshold comparator 160 and the measurement comparator 155 are combined into a single comparator. In one embodiment, other comparators may be used, such as a curve fitting comparator or a slope comparator.

The step count buffer 165 keeps track of probable steps. The exact behavior of the step count buffer 165 depends on which operating mode the electronic device 100 is in. In one embodiment, the operating mode that the electronic device is in is determined by the mode logic 190. In the illustrated embodiment, the mode logic 190 is a component of the step counting logic 130. In an alternative embodiment, the mode logic 190 is a separate logic from the step counting logic 130. In one embodiment, operating modes include a non-active mode, in which periodic human motions are buffered, and an active mode, in which periodic human motions are counted. In one embodiment, operating modes include a sleep mode, a step counting mode, an entry mode, and an exit mode. Operating modes are discussed in greater detail below in reference to FIG. 3.

Returning to FIG. 1, when the threshold comparator 160 and measurement comparator 155 both indicate that a measurement is a step, then the step count buffer 165 is incremented by one. Depending on the mode, when the step count buffer 165 reaches a certain amount, the step count buffer 165 is emptied and the final count 175 is incremented by the amount of steps that were in the step count buffer 165. The number of steps that must be counted by the step count buffer 165 before they register as actual steps may vary from one to ten or more, depending on the current operating mode. The final step count 175 keeps track of the total number of steps that have occurred. In one embodiment, this data is transmitted to a server or remote database.

Figure 3:
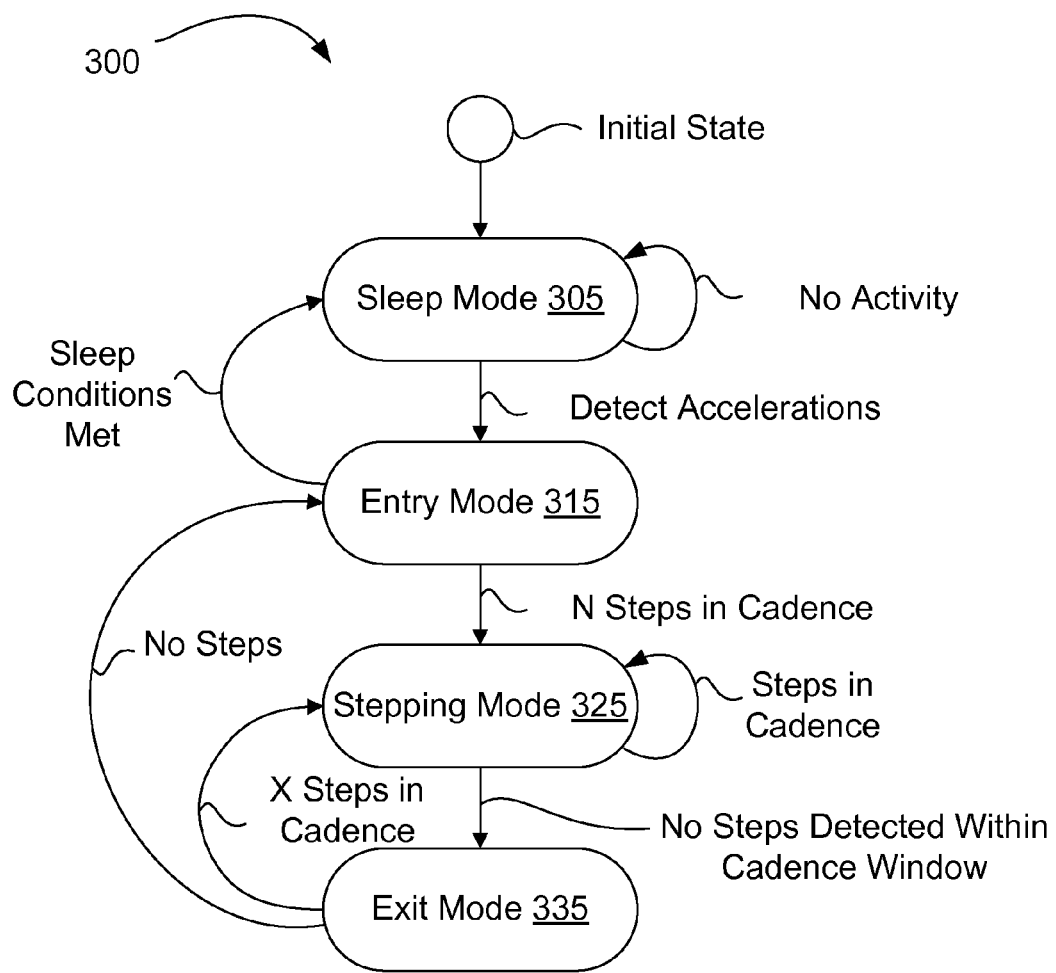
FIG. 3 shows a state diagram for the behavior of a system of monitoring human activity using an inertial sensor, in accordance with one embodiment of the present invention.

FIG. 3 shows a state diagram for the behavior 300 of a system for monitoring human activity, in accordance with one embodiment of the present invention. The system may have multiple operating modes (states) that are navigated between by processing logic that may comprise hardware (e.g., circuitry, dedicated logic, programmable logic, microcode, etc.), software (such as instructions run on a processing device), or a combination thereof. In one embodiment, behavior 300 is the behavior of the electronic device 100 of FIG. 1.

The behavior 300 may include four operating modes for monitoring human activity: a sleep mode, an entry mode, a stepping mode, and an exit mode. In alternative embodiments, a different number of modes may be used. In one embodiment, only two modes are used: active mode and non-active mode. The active mode is entered once continuous steps within the cadence window have been identified, while the non-active mode is used for all other states. In alternative embodiments, multiple inactive modes and/or active modes are used. To navigate between modes, certain conditions must be met. The conditions may include exit conditions for terminating an active mode and entry conditions for initiating inactive modes. Each mode may have different exit and entry conditions.

Use of different conditions for different operating modes increases the reliability of the device that is monitoring the human activity. For example, once an object (e.g., a person) is moving, they are more likely to remain moving than to stop. Likewise, if a person is not moving, they are more likely not to move than to begin moving. These principles can be applied by requiring more stringent conditions to be met for a device to initiate a walking (stepping) mode than to continue the walking mode. The different modes may each have rules that reflect what is more likely to happen for subsequent measurements. This may reduce or eliminate the number of uncounted steps and/or false step counts.

Referring to FIG. 3, modes 300 in one embodiment include a sleep mode 305, an entry mode 315, a stepping mode 325, and an exit mode 335. In one embodiment, the power level of the system or device is linked to these modes.

The first mode initiated is the sleep mode 305. When no activity (acceleration) is detected, the system remains in sleep mode 305. When acceleration is detected, an entry mode 315 is initiated.

Once in entry mode 315, acceleration may be monitored to detect steps. When N steps are detected in appropriate cadence windows, a stepping mode 325 is initiated. If N steps are not detected within a period of time, sleep mode is reinitiated. In one embodiment, sleep mode is only initiated if no motion is detected.

Once in stepping mode 325, acceleration data is monitored to count steps according to a predefined set of rules or motion criteria. According to one of these criteria, steps are expected to occur within a set interval (e.g., within a cadence window). When a step is counted within the set interval, then the stepping mode 325 is continued. When a step is not detected within the set interval, an expected step has not occurred, and an exit mode 335 is initiated.

In exit mode 335, processing logic determines whether a predetermined number of steps (X) are detected at a particular cadence. The predetermined number of steps X may be the same as, or different from, the number of steps N. When X steps are detected in a cadence, stepping mode 325 is reinitiated. When X steps are not detected within a period of time, entry mode 315 is reinitiated.

Figure 4:
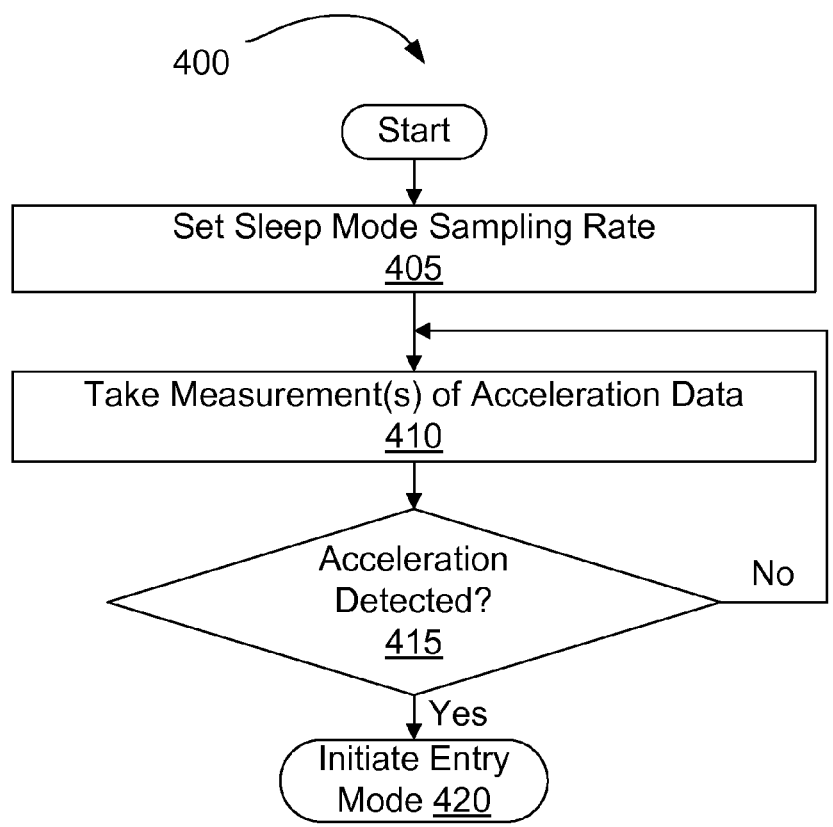
FIG. 4 illustrates a flow diagram for a method of operating an electronic device in sleep mode, in accordance with one embodiment of the present invention.

FIG. 4 illustrates a flow diagram for a method 400 of operating an electronic device in sleep mode, in accordance with one embodiment of the present invention. In one embodiment, method 400 corresponds to the sleep mode 305 of FIG. 3. In one embodiment, the method 400 may begin when no relevant acceleration has been detected for a predetermined time interval, or when no steps have been detected for a predetermined time interval. In one embodiment, when no acceleration above a threshold value is detected for a set period of time, the sleep function is initiated. In another embodiment, when a motion signature indicative of an activity that does not need to be monitored is detected, the sleep function is initiated. For example, when the motion signature of driving is detected, the sleep function may be initiated. The time period that elapses before the sleep mode is initiated may be a fixed value, or it may be adjusted automatically by processing logic or based on user input (e.g. in response to a user selection of desired battery longevity verses desired performance, or based on the last measured cadence window).

Referring to FIG. 4, method 400 begins with setting a sleep mode sampling rate (block 405). In one embodiment, a low sampling rate is set. This reduces power consumption and prolongs battery life. In one embodiment, the sleep mode sampling rate is a fixed value. In alternative embodiments, the sleep mode sampling rate can be modified automatically by processing logic based on certain criteria such as time of day, user behavior patterns, etc., or based on user input.

In one embodiment, a sampling function is periodically executed in sleep mode, wherein the sampling function samples acceleration data at a set sampling rate for a set time period. For example, the sampling function may be executed every ten seconds for a duration of one second, and a sampling rate of fifty measurements per second may be set for that one second of operation. In one embodiment, the sampling function repeats at a relatively slow rate (e.g., once every 10 seconds), and the sampling rate within the sampling function is relatively high (e.g., 50 Hz). The sampling function may be used to detect unwanted motion signatures, or to maintain a device in low power sleep mode, for example, while a user is driving in a car.

In one embodiment, the sleep mode sampling rate is set to zero. The sleep mode may be set to zero, for example, when an inertial sensor has 'inertial wakeup' functionality. Inertial wakeup functionality enables processing logic to switch from sleep mode to entry mode when an acceleration exceeding a set threshold is detected. The inertial wakeup may be used to simultaneously exit sleep mode and power-up additional functionality.

At block 410, measurements of acceleration data are taken. At block 415, processing logic determines whether or not relevant acceleration is detected. Relevant acceleration includes acceleration that meets certain relevancy criteria. In one embodiment, the relevancy criteria include a lower threshold and an upper threshold. In alternative embodiments, other relevancy criteria may also be used, such as a requirement that acceleration be continuously measured for a preset time period.

When no relevant acceleration is detected, or when the 'inertial wakeup' pin has not triggered (for inertial sensors having 'inertial wakeup functionality'), sleep mode continues, and further measurements of acceleration data are taken at the set sleep mode sampling rate (block 410). When acceleration is detected, sleep mode is terminated and entry mode is initiated (block 420). In one embodiment, the acceleration that is detected and its rate of change must meet certain criteria to terminate sleep mode.

Figure 5:
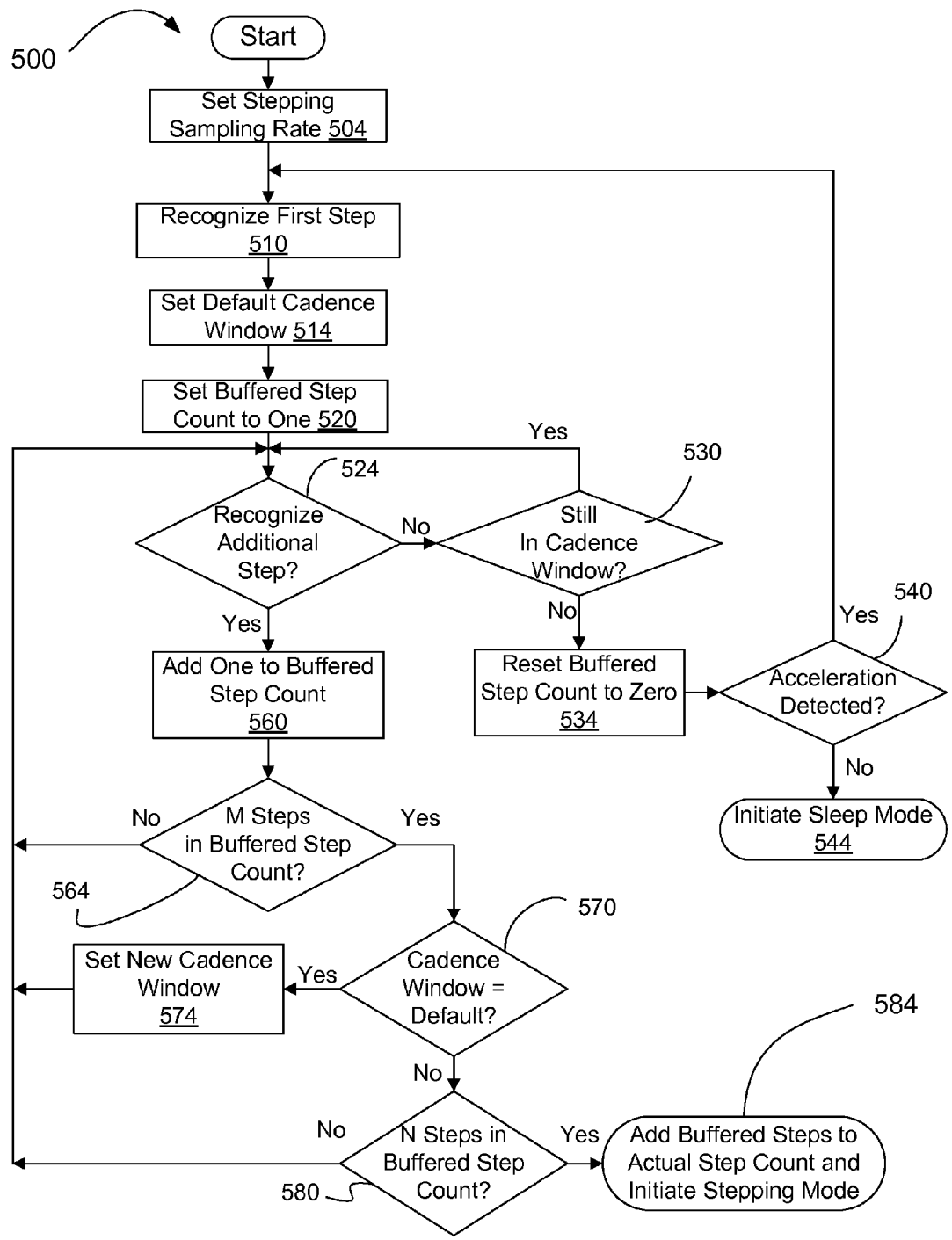
FIG. 5 illustrates a flow diagram for a method of operating an electronic device in entry mode, in accordance with one embodiment of the present invention.

FIG. 5 illustrates a flow diagram for a method 500 of operating an electronic device in entry mode, in accordance with one embodiment of the present invention. In one embodiment, method 500 corresponds to the entry mode 315 of FIG. 3. The entry mode may be initiated when a user first begins an activity in which steps may be detected. In one embodiment, the method 500 begins when any relevant acceleration is detected. In one embodiment, entry mode is initiated when a measurement of acceleration that meets certain criteria has been detected. In one embodiment, method 500 is initiated when a sleep mode is terminated.

Referring to FIG. 5, method 500 begins by setting the sampling rate to a stepping sampling rate (block 504). The stepping sampling rate is set to facilitate accurate measurements of steps, and may be a fixed or a dynamically variable rate. A variable sampling rate may automatically adjust depending on a period of a detected stepping cadence, may be user adjusted, may adjust based on applications being run by processing logic, or by other means. The stepping sampling rate may be set to anywhere between about 10 and about 200 Hz. In one embodiment, the stepping sampling rate is set to about 15 to 40 Hz.

At block 510, a first step is recognized. Since no previous steps have been measured, and there is no cadence window, the first step may be recognized at any time. Once a first step is recognized, a default cadence window is set (block 514). The default cadence window may have a minimum and maximum such that steps will be counted for most or all possible stepping cadences, whether a user is walking slowly or sprinting. In one embodiment, the default cadence window has a minimum of around 325 ms and a maximum of around 1000 ms.

In one embodiment, an initial default value is set wide enough to accommodate all users, and is then dynamically adjusted to match the specific user in question. Processing logic may 'learn' (adapt to) a particular user, and may become more accurate as steps are counted. Processing logic that has the ability to learn or adapt to different users may create an individualized profile for each user. Multiple profiles may also be created for each user, the different profiles reflecting different user activity. For example, a first profile might be created for a user's running and a second profile may be created for a user's walking. Processing logic may switch between different profiles automatically, or manually based on user input. In one embodiment, processing logic compares a current cadence and/or motion cycle pattern to stored profiles. When a current cadence or motion cycle pattern matches that of a stored profile, that profile is activated.

At block 520, a buffered step count is set to one. At block 524, processing logic determines whether an additional step is recognized. An additional step may be recognized if a particular measurement of acceleration meets all the necessary criteria. One embodiment of these criteria is discussed below with reference to FIG. 8.

Returning to FIG. 5, if an additional step is recognized, method 500 continues to block 560. If no additional steps are recognized, then processing logic determines whether the time is still within the cadence window (block 530). If there is still time within the cadence window, the process returns to block 524. If the cadence window has closed, then the buffered step count is reset to zero (block 534). The process then continues to block 540.

At block 540, processing logic determines whether any relevant acceleration is detected. If no relevant acceleration is detected, then sleep mode is initiated (block 544). If some relevant acceleration is detected, then processing logic returns to block 510 to await recognition of another first step. If at block 524 an additional step was recognized, the process continues to block 560.

At block 560, an additional step is added to the buffered step count. Processing logic then checks whether there are M counts in the buffered step count (block 564). In one embodiment, M is an integer value between about 4 and 10. If there are not at least M steps in the buffered step count, then the process returns to block 524.

If the buffered step count is equal to or greater than M, then the processing logic checks whether the cadence window is set to the default (block 570). If the cadence window is still set to the default, then a new cadence window is set (block 574) based on a stepping cadence of the M steps measured. The process then returns to block 524. If the cadence window is not set to the default, then processing logic continues to block 580. In an alternative embodiment, once there are M steps in the buffered step count, the cadence window may be adjusted for each additional step that is recognized.

At block 580, processing logic checks whether there are N steps in the buffered step count (block 580), where N may be an integer value greater than M. When there are not yet N steps in the buffered step count, the process returns to block 524 to continue in entry mode. When the number of steps in the buffered step count reaches N, the buffered steps are added to an actual or final step count, and a stepping mode is entered into (block 584).

Figure 6:
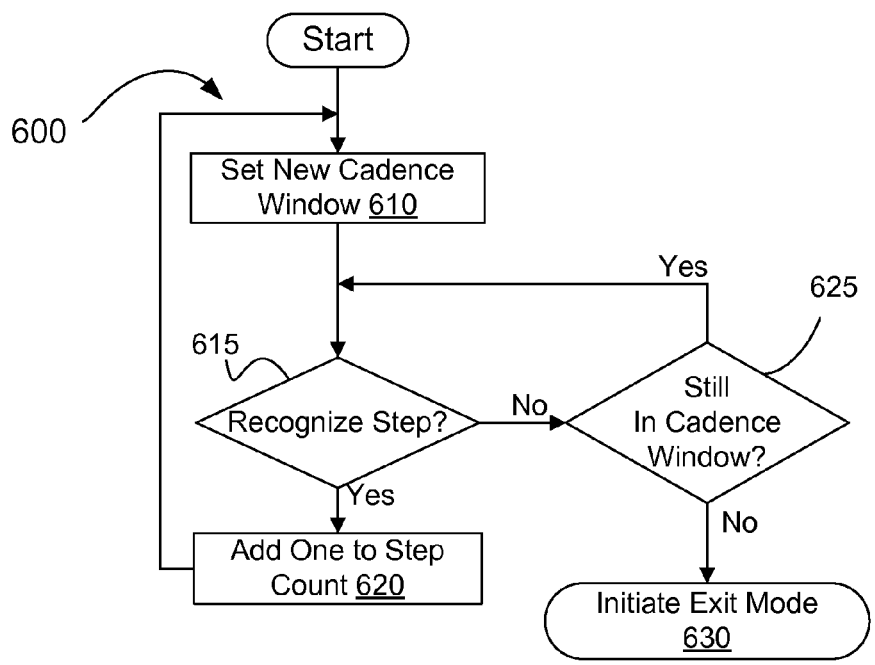
FIG. 6 illustrates a flow diagram for a method of operating an electronic device in stepping mode, in accordance with one embodiment of the present invention.

FIG. 6 illustrates a flow diagram for a method 600 of operating an electronic device in stepping mode, in accordance with one embodiment of the present invention. In one embodiment, method 600 corresponds to the stepping mode 325 of FIG. 3. The stepping mode may be initiated when a user has been walking long enough for a buffered step count to fill. In one embodiment, method 600 is initiated when an entry mode is terminated, and/or when an exit mode is terminated.

Referring to FIG. 6, method 600 begins by setting a cadence window (block 610). The cadence window may be set based on previous measurement data. In one embodiment, the cadence window is set based on a rolling average of stepping periods. In one embodiment, the cadence window may be identical to the cadence window used during entry mode. Once the cadence window is set, measurement data is checked to determine whether an additional step is recognized (block 615). If an additional step is recognized, then it is added to the final or actual step count (block 620). If no additional step is recognized, then processing logic determines whether the current measurement was taken within the cadence window (block 625). If the cadence window has not elapsed, the process returns to block 615. If the cadence window has elapsed, then an expected step was not counted, and an exit mode is initiated (block 630).

Figure 7:
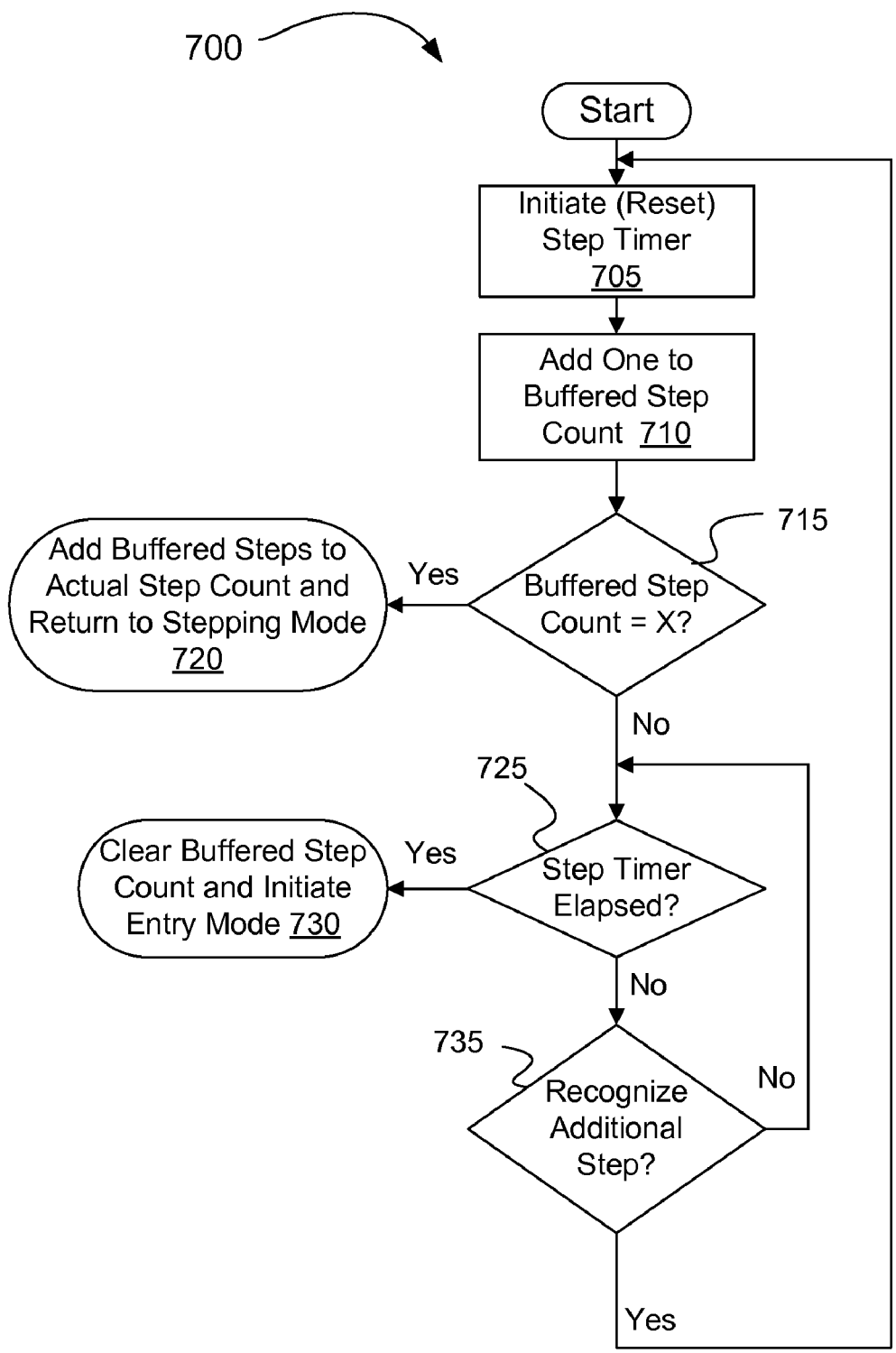
FIG. 7 illustrates a flow diagram for a method of operating an electronic device in exit mode, in accordance with one embodiment of the present invention.

FIG. 7 illustrates a flow diagram for a method 700 of operating an electronic device in exit mode, in accordance with one embodiment of the present invention. In one embodiment, method 700 corresponds to the exit mode 335 of FIG. 3. The exit mode may be entered into when an expected step is not identified in stepping mode.

In one embodiment, the requirement(s) for changing from exit mode to stepping mode are less strict than the requirement(s) for switching from entry mode to stepping mode. Processing logic may assume that when a user has recently taken a step, the user is most likely to take another step. Processing logic may also assume that if a user has not just taken a step, it is most likely that they will not take one. These assumptions may be implemented by imposing more stringent requirements to switch from entry mode to stepping mode than to change from exit mode to stepping mode.

An expected step may not be identified, for example, when a user stops walking, when extraneous movements such as gestures are made that interfere with the step count, or when a device orientation is changed as a step occurs. In one embodiment, the exit mode assumes that a step has been missed, so that if the exit mode determines that a user is still walking, the originally uncounted step is not missed.

The process begins by initiating a step timer (block 705). The step timer measures the amount of time that has passed since a step has been identified. In one embodiment, the step timer is a countdown timer that terminates exit mode when the timer reaches zero. In one embodiment, the step timer starts counting when a cadence window minimum is reached, and stops counting when a cadence window maximum is reached. In an alternative embodiment, the step timer starts counting as soon as the exit mode is initiated, and stops counting when a cadence window maximum is reached. In one embodiment, the step timer starts counting at 240 ms from the time that the expected step should have occurred.

At block 710, a step is added to a buffered step count. At block 715, processing logic determines whether the buffered step count is equal to X, where X of the number of identified steps in exit mode. In one embodiment, X is between 3 and 8. If the buffered step count is equal to X, then the buffered steps are added to the actual step count and stepping mode is reinitiated (block 720). If the buffered step count is not equal to X, then processing logic proceeds to block 725.

At block 725, processing logic determines whether the step timer has timed out (allotted time has elapsed). In one embodiment, the step timer times out when no steps are counted within a cadence window. In one embodiment, the step timer times out when no steps are counted in two or more cadence windows. If the allotted time has elapsed, then the buffered step count is cleared, and entry mode is initiated (block 730). If the allotted time has not elapsed, then processing logic determines whether an additional step is recognized (block 735). If a step is recognized, then the step timer is reset (block 705), the buffered step count is incremented by one (block 710), and on the process continues to block 715. If a step is not recognized, then processing logic returns to block 725 to determine whether the step timer has elapsed. In an alternative embodiment, the step timer is not reset when an additional step is recognized, and the buffered step count must reach X in the time initially allotted by the step timer. In that instance, the step timer is set at greater than X times the cadence window.

Figure 8:
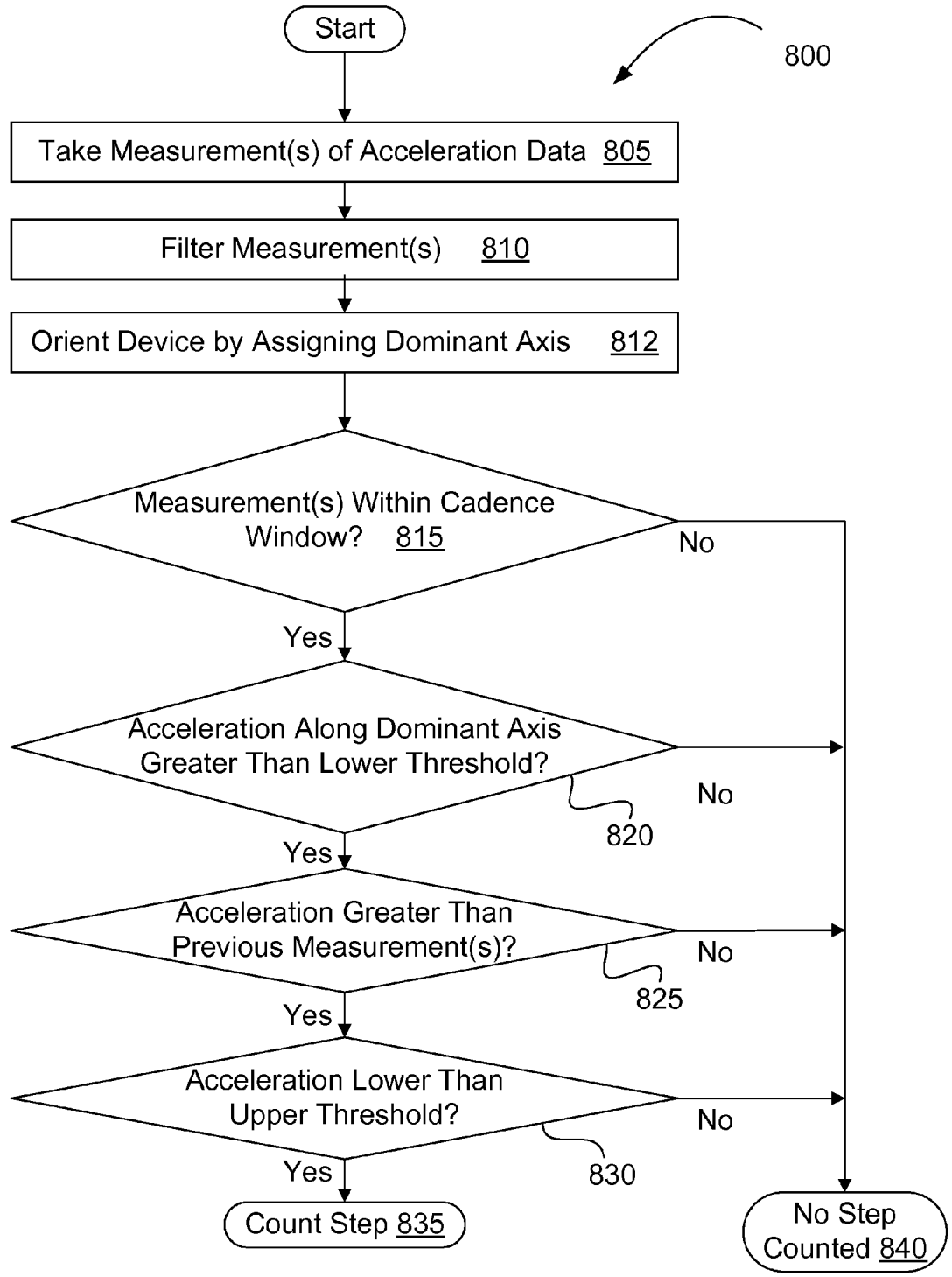
FIG. 8 illustrates a flow diagram for a method of recognizing a step in accordance with one embodiment of the present invention, in accordance with one embodiment of the present invention.

FIG. 8 illustrates a flow diagram for a method 800 of recognizing a step, in accordance with one embodiment of the present invention. In one embodiment, method 800 may be executed by blocks 510 and 524 of FIG. 5, block 615 of FIG. 6 and block 735 of FIG. 7. In one embodiment, method 800 is performed by electronic device 100 of FIG. 1.

Referring to FIG. 8, method 800 begins with measurements of acceleration data being taken (block 805). Measurements are taken according to a sampling rate, which may vary from about one measurement per second to many measurements a second, depending on the operating mode being used.

At processing block 810, in one embodiment measurements are filtered. Measurements can be filtered to remove high frequency data and/or low frequency data. In one embodiment, what data to filter depends on the type of user activity detected. At processing block 812, in one embodiment the inertial sensor is oriented by assigning a dominant axis. Assigning a dominant axis may include calculating rolling averages of acceleration and assigning the dominant axis based on the rolling averages of acceleration.

At block 815, processing logic determines whether a measurement is within a cadence window. If the measurement is not within a cadence window, then no step may be recognized or counted for that measurement (block 840). If the measurement is within the cadence window, the process continues to block 820.

At block 820, processing logic determines whether acceleration along the dominant axis is greater than a lower threshold. If the measurement is not greater than the lower threshold, no step may be recognized or counted for that measurement (block 840). If the measurement is greater than the lower threshold, the processing logic continues to block 825.

In one embodiment, the measurement may qualify as a step if it is the first measurement that crosses the lower threshold. In an alternative embodiment, the measurement with the greatest acceleration within a cadence window (e.g. a peak) may be counted as a step.

The lower threshold may be based on a rolling average of accelerations as determined by the rolling average logic 135 of FIG. 1. In one embodiment, the rolling average of accelerations that is used to set the lower threshold has a sample period that is about twice the stepping period. In alternative embodiments, other sample periods are used for the rolling average.

In one embodiment, the lower threshold is set such that an absolute value of a measurement must exceed an absolute value of the rolling average to be counted as a step. Multiple lower thresholds may be set, and a current measurement may be compared to one or more of the lower thresholds depending on operating conditions. For example, a negative lower threshold may be used if acceleration is detected in a negative direction (e.g., when device is upside down), and a positive lower threshold may be used if acceleration is detected in a positive direction (e.g., device is right-side up). In one embodiment, absolute values may be used.

In one embodiment, the measurement must exceed the rolling average by a set margin. The margin may be set automatically by processing logic, or it may vary based on the orientation of the electronic device or inertial sensor(s), user input, and/or other criteria.

In one embodiment, the lower threshold is adjusted based on an orientation of the electronic device and/or an orientation of the inertial sensor(s) within the electronic device. If an axis is closely aligned with gravity, a first threshold may be used. If no axes are closely aligned to gravity, other thresholds may be used. In one embodiment, a variable threshold is used, the variable threshold having a larger value when an axis is closely aligned to gravity, and progressively lower values as an axis most closely aligned with gravity is moved out of line with gravity. The variable threshold can be implemented using a data structure (e.g., a lookup table, hash table, adjacency matrix, etc.), comparison to a virtual axis, or by performing trigonometric calculations.

At block 825, processing logic determines whether acceleration along the dominant axis is greater than previous measurements. In one embodiment, acceleration along the dominant axis for a present measurement is compared to the previous 1 to 4 measurements.

In one embodiment, the absolute value of the present measurement is compared to the absolute value of the previous measurement or measurements. By comparing the absolute value of acceleration along the dominant axis to previous absolute value(s) of acceleration, processing logic may determine whether the acceleration of a user is moving away from the influence of gravity (e.g. whether a person is lifting a foot from the ground rather than planting it on the ground). In one embodiment, a measurement qualifies as a step when it reflects that the acceleration of a user is moving away from gravity. Alternatively, a current measurement may qualify as a step if it has an absolute value that is less than absolute values of the previous measurements, indicating that the acceleration of a user is moving towards gravity.

If the absolute value of the current measurement is not greater than the absolute values of the measurements compared to, then no step may be recognized or counted for that measurement (block 840). If the absolute value of the measurement is greater than the absolute values of previous measurements, then the process continues to block 830.

At block 830, processing logic determines whether acceleration for a particular measurement is lower than an upper threshold. In one embodiment, only acceleration along the dominant axis is compared to the upper threshold. In one embodiment, accelerations along all axes are compared to the upper threshold. If the current measurement is not lower than the upper threshold, then no step may be recognized or counted for that measurement (block 840). If the measurement is lower than the upper threshold, then a step may be counted (block 835). The upper threshold may be set to prevent sudden accelerations such as taps from being counted as steps.

Blocks 815, 820, 825 and 830 show four criteria that may be used to accurately determine whether user has walked or run one step. These criteria may be dynamic motion criteria that are updated continuously as current conditions change (e.g., as an inertial sensor changes orientation, as a user changes cadence, etc.). Alternatively, these criteria may be static criteria that are preset, or criteria that may be changed through user input.

As noted above, though embodiments of the present invention are described in reference to steps, the present invention equally applies to other periodic human motions. Other criteria may also be used in addition to, or in place of, those listed above. These criteria may reduce or eliminate the number of false steps counted and/or the number of missed steps. Examples of other criteria include specific rates of change in acceleration between measurements, specific shapes and/or sharpness of acceleration peaks for motion cycles, particular amplitudes of periodic human motions, etc. These and other criteria may be applied to embodiments of the present invention.

Figure 9:
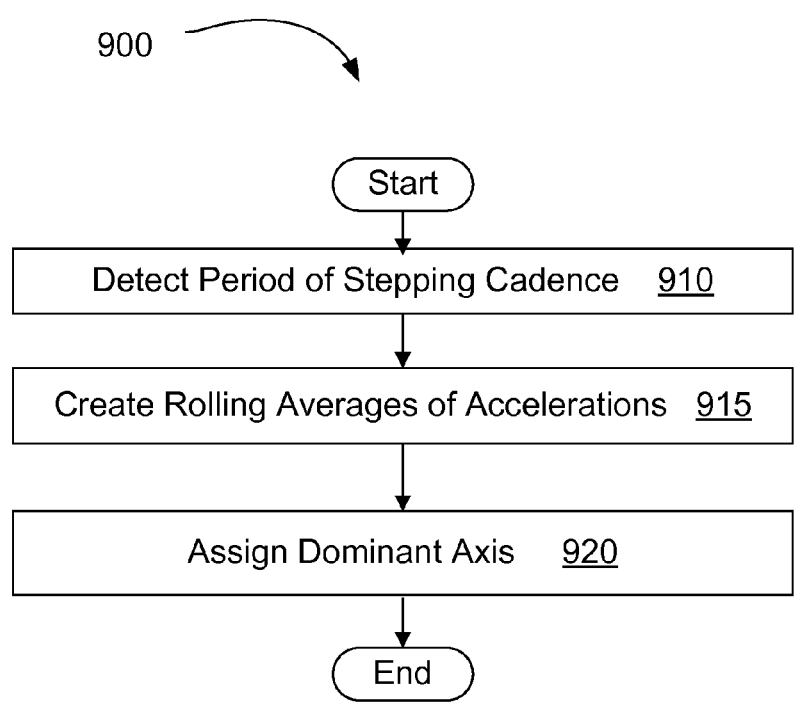
FIG. 9 illustrates a flow diagram for a method of orienting an inertial sensor, in accordance with one embodiment of the present invention.

FIG. 9 illustrates a flow diagram for one embodiment of a method 900 of orienting an inertial sensor. In one embodiment, the method 900 is executed by block 812 of FIG. 8.

Referring to FIG. 9, method 900 begins with detecting a stepping period (block 910). In one embodiment, the method 900 may begin by detecting a stepping cadence. At block 915, rolling averages of accelerations are created. The rolling averages of accelerations may be created based on the stepping period (or stepping cadence). In one embodiment, multiple rolling averages of accelerations are created.

At block 920, a dominant axis is assigned. In one embodiment, the dominant axis is assigned after identifying a gravitational influence. The gravitational influence may be identified by calculating total acceleration based upon the acceleration on each axis. In one embodiment, the percentage of the total acceleration can then be assigned to each axis and an approximate device orientation can be determined.

In the foregoing description, numerous specific details have been set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention may be performed by hardware components or may be embodied in machine-executable instructions, which may be used to cause a general-purpose or special-purpose processor programmed with the instructions to perform the method described above. Alternatively, the method may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media or machine-readable mediums suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   detecting motion by an inertial sensor included in a mobile device;
   determining, by the mobile device, whether the motion has a motion signature indicative of a user activity that the mobile device is configured to monitor;
   when the motion does not have a motion signature of a user activity that the mobile device is configured to monitor, entering a sleep mode.

2. The method of claim 1, further comprising:
   when the motion does have a motion signature of a user activity that the mobile device is configured to monitor, monitoring for future motions having the motion signature.

3. The method of claim 1, further comprising, while the mobile device is in the sleep mode:
   periodically sampling acceleration data at a predetermined sampling rate, wherein each sample includes acceleration data measured by the inertial sensor over a predetermined time period; and
   when acceleration data having a motion signature indicative of a user activity that the mobile device configured to monitor is detected within the predetermined time period, exiting the sleep mode.

4. The method of claim 1, wherein the inertial sensor has an inertial wakeup functionality, the method further comprising, while the mobile device is in the sleep mode:
   detecting a motion sufficient to trigger the inertial wakeup;
   sampling acceleration data for a predetermined time period;
   determining whether the acceleration data includes a motion signature indicative of a user activity that the mobile device is configured to monitor; and
   when the acceleration data includes a motion signature indicative of a user activity that the mobile device is configured to monitor, exiting the sleep mode.

5. A method for a mobile device comprising:
   receiving acceleration data that meets stepping criteria from an accelerometer included in the mobile device;
   incrementing a step count in a step count buffer;
   when at least one of a) the step count is below a step count threshold, or b) a current user cadence fails to match a step cadence of a user profile, using a default step cadence window to identify a time frame within which to monitor for a next step; and
   when the step count is at or above the step count threshold, determining a dynamic step cadence window and using the dynamic step cadence window to identify the time frame within which to monitor for the next step.

6. The method of claim 5, wherein the step count buffer represents probable steps, the method further comprising:
   emptying the step count buffer and acknowledging the step counts from the step count buffer as actual steps when the step count buffer reaches the step count threshold; and
   entering a stepping mode upon emptying the step count buffer.

7. The method of claim 5, further comprising, upon determining the dynamic step cadence window:
   examining previous acceleration data to determine whether any additional steps would have been counted if the dynamic step cadence window had been used when the previous acceleration data was received; and
   counting those additional steps.

8. The method of claim 5, wherein determining the dynamic step cadence window comprises:
   computing a rolling average of stepping periods of previously counted steps; and
   setting the dynamic step cadence window based on the rolling average of stepping periods.

9. The method of claim 5, wherein the stepping criteria comprise:
   a first criterion that is satisfied when a current acceleration measurement has a greater magnitude than a previous acceleration measurement;
   a second criterion that is satisfied when the current acceleration measurement has a greater magnitude than a lower threshold; and
   a third criterion that is satisfied when the current acceleration measurement has a lesser magnitude than an upper threshold.

10. The method of claim 5, further comprising:
    determining an orientation of the mobile device with respect to gravity;
    assigning a dominant axis based on the orientation; and
    comparing only acceleration data for the dominant axis to the to the stepping criteria to make a determination that the acceleration data meets the stepping criteria.

11. The method of claim 5, further comprising:
    when the current user cadence matches the step cadence of a user profile, using a stored step cadence window of the user profile to identify the time frame within which to monitor for the next step.

* * * * *